United States Patent [19]

Cacheux

[11] Patent Number: 4,939,444

[45] Date of Patent: Jul. 3, 1990

[54] DUAL COIL SUPER CONDUCTING APPARATUS FOR STORING ELECTRICAL ENERGY

[75] Inventor: Jean Cacheux, Castanet Tolosan, France

[73] Assignee: Centre National d'Etudes Spatiales, Paris, France

[21] Appl. No.: 279,720

[22] Filed: Dec. 5, 1988

[30] Foreign Application Priority Data

Dec. 21, 1987 [FR] France .............................. 87 17846

[51] Int. Cl.⁵ .............................................. H01F 36/00
[52] U.S. Cl. ............................. 323/360; 336/DIG. 1; 505/869
[58] Field of Search .................. 323/360; 336/DIG. 1; 363/14

[56] References Cited

U.S. PATENT DOCUMENTS

| | | | |
|---|---|---|---|
| 3,143,720 | 8/1964 | Rogers | 323/360 |
| 3,158,794 | 11/1964 | Swartz | 335/216 |
| 3,701,906 | 10/1972 | Denel et al. | 336/DIG. 1 |
| 4,032,959 | 6/1977 | Boom et al. | 336/DIG. 1 |
| 4,222,004 | 9/1980 | Abramian | 336/DIG. 1 |
| 4,414,461 | 11/1983 | Wolf | 336/DIG. 1 |
| 4,568,900 | 2/1986 | Agatsuma et al. | 336/DIG. 1 |

FOREIGN PATENT DOCUMENTS 1038554 3/1963 United Kingdom .

*Primary Examiner*—Patrick R. Salce
*Assistant Examiner*—Jeffery Sterrett
*Attorney, Agent, or Firm*—Nixon & Vanderhye

[57] ABSTRACT

Disclosed is an apparatus for storing electrical energy in a superconducting coil. The secondary phenomenon of magnetic induction which limits the size of existing superconducting energy storage coils is overcome by utilizing two superconductor material coils coupled by mutual induction through a high permeability magnetic material. This eliminates induction in the superconductor material thus eliminating the difficulty of the destruction of superconducting capability because of secondary induction. This construction permits high current storage capability in a small volume.

11 Claims, 1 Drawing Sheet

DUAL COIL SUPER CONDUCTING APPARATUS FOR STORING ELECTRICAL ENERGY

BACKGROUND OF THE INVENTION

1. Field of the Invention

The present invention relates to an apparatus for storing electrical energy in a superconductor. It has a general application in the storage of energy, namely in the laboratory, in industry, on board vehicles, in artificial satellites, orbiting stations, space probes, etc.

2. Description of Related Art

As from the earliest superconductors, the dream was to store in such materials energy brought into an electrical form by producing a current in a superconductor coil. The energy E stored in a coil of radius R placed in vacuum and traversed by a current I is:

$$E = \tfrac{1}{2}\mu_0 I^2 \qquad (1)$$

in which $\mu_0$ is the magnetic permeability of the vacuum.

However, only a limited amount of energy can be stored under such conditions. Thus, with a current of $10^5$ Acm$^{-2}$ and a coil of radius 0.5 m, a stored energy of 1570 Joules or 0.43 Wh is obtained. Naturally by increasing the radius of the coil, there is a proportional increase in the stored energy and with a radius 50 m coil 43 Wh would be obtained. However, such an energy level is still modest.

If it is also borne in mind that such a coil with a diameter of 100 m has to be immersed in liquid helium, it is apparent that this storage process is theoretical rather than practical.

The arrival of new oxide-based superconductors operating at temperatures of approximately 90K has made such installations somewhat less heavy, mainly through the replacement of liquid helium by liquid nitrogen. The latter is, however much less easy to use and has a much higher latent heat of vaporization (198 instead of 20 J/g). However, the energy quantities stored are still small.

Consideration could be given to the associatition with the storage ring of a high magnetic permeability material in order to proportionally increase the stored energy (relation 1). Thus, with a permeability equal to $10^5$, which corresponds to permalloy, it would be expected that there would be a stored energy equal to 43 kWh for a 0.5 m radius coil traversed by a current of $10^5$ Acm$^{-2}$.

Unfortunately, a secondary phenomenon makes such a solution illusory. The magnetic induction produced by the coil would become too great, so that the material used would lose its super conducting property. Thus, with a field of $10^5$ A/m, the induction in vacuum is 0.125 Tesla. With permalloy, this induction would increase to $12.5 \cdot 10^3$ Tesla, which is incompatible with the critical induction of the known superconductor materials, which is a few Teslas. However, even if advances in this respect were to be expected, so that in the near future critical inductions of about 10 Teslas could be awaited, the recommended solution is still inappropriate.

SUMMARY OF THE INVENTION

The object of the present invention is to obviate these disadvantages. It solves the problem of the critical induction and thus makes it possible to use high magnetic permeability materials. As a result of the invention, it is then possible to store large energy quantities in very simple realization conditions.

The installation according to the invention also has very small dimensions, so that said storage means is provided with a very vast range of application which had previously been closed to it. Thus, the apparatus according to the invention can easily be carried in vehicles, such as cars, or on board artificial satellites.

The invention makes it possible to achieve this objective by the use of two superconductor material coils coupled by mutual induction and by the use of a high permeability magnetic material.

The use of a second coil in mutual induction with the first makes it possible to eliminate the induction in the superconductor material. Thus, the bringing about of a current flow in the first coil leads to the formation of a current flowing in the opposite direction in the second and whereby said current is maintained because the material is superconducting. The resulting induction is then zero, which eliminates the difficulty referred to hereinbefore relative to the existance of a critical induction which must not be exceeded.

It is therefore possible to use a high magnetic permeability material placed in the vicinity of the coils in order to increase the stored energy quantity and the resulting induction will remain below the critical induction. The two coils can be arranged in two parallel planes, one above the other and with their axes coinciding. However, the coils can also be placed within the same plane, one within the other.

Each of the coils can be constituted by strands of superconducting material coated with a good electrical insulating and resistant material (e.g. silica). Two such coils can be juxtaposed. It is also possible to connect only part of the strands to a current injection and extraction source in order to form the first coil in the electrical sense of the term and close the other strands on themselves to form the second coil. It is also possible to interlace the different strands.

Naturally, the invention is not limited to the use of a single pair of coils. It covers all variants with a random number of pairs of coils. For example, it is possible to form nested helical windings, which is equivalent to pairs of coils connected in series.

The apparatus according to the invention comprises means for injecting and extracting current with respect to the first coil. Any known means can be used, as in the prior art, the invention not essentially relating to this point. For example, it is possible to use a magnetostriction device.

BRIEF DESCRIPTION OF THE DRAWINGS

The features and advantages of the invention will become more apparent on reading the following description of non-limitative, illustrative embodiments and with reference to the attached drawings, wherein show.

DETAILED DESCRIPTION OF PREFERRED EMBODIMENTS

Figure 1:
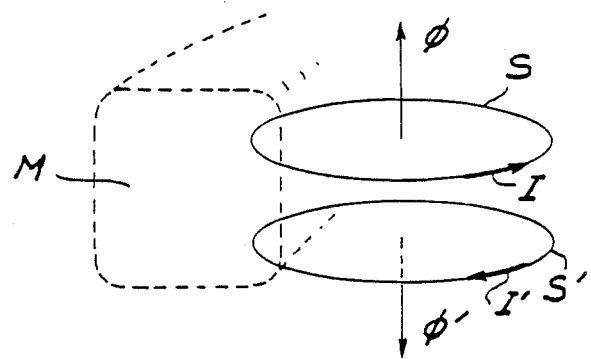
FIG. 1 diagrammatically two superconductor coils in mutual induction.

FIG. 1 shows a superconductor material coil S in which has been induced a current I, by a not shown means, but which will be described hereinafter. The magnetic induction $\phi$ created by this current, induces a current I' in the second superconductor coil S'. This leads to an induction $\phi'$ in the direction opposite to $\phi$. Following electrical excitation, the induction resultant is substantially zero. This situation is maintained for as long as the material constituting the coils remains superconducting.

A high permeability magnectic circuit M is positioned in the vicinity of the coils S and S'.

For example, the following values can be used:
Critical current of the superconductor $10^5$ Acm$^{-2}$
Nominal current in the coils $4 \cdot 10^4$ Acm$^{-2}$
Critical induction of the superconductor: 2 Teslas
Critical temperature of the superconductor: 92K
Temperature of use: 80K
Section of the coils: $5 \times 0.2$ cm$^2$
Radius of the coils: 0.5 m
Number of strands for each coil: 25

As the self-induction coefficient is determined by the known formula:

$$L = \mu R (Log(8R/r) - 7/4)$$

we obtain:

$$L = 9.17 H$$

The mutual coupling coefficient can be cosidered equal to 1/10 of this value, i.e.:

$$M = 0.9 H$$

Thus, the energy which can be stored is:

$$W = M I^2 = 1.44 \; 10^9 \; J$$

i.e.

$$W = 400 \; kWh$$

With a charging and discharging efficiency close to 20%, finally an energy of 80 kWh is obtained.

This stored energy tends to be released by the forces tending to force apart the coils. The repulsive force is proportional to $B^2/2\mu r$ per unit of surface. Moreover, each coils tends to increase its self-induction coefficient, i.e. it tends to widen.

These forces are important and impose adapted mechanical structures. This is an essential point for mobile systems or systems which can be embarked on board orbiting stations. The coupling ensured by the high magnetic permeability material makes it possible to offer a first resistance belt, as is shown by the variant of FIG. 2.

Figure 2:
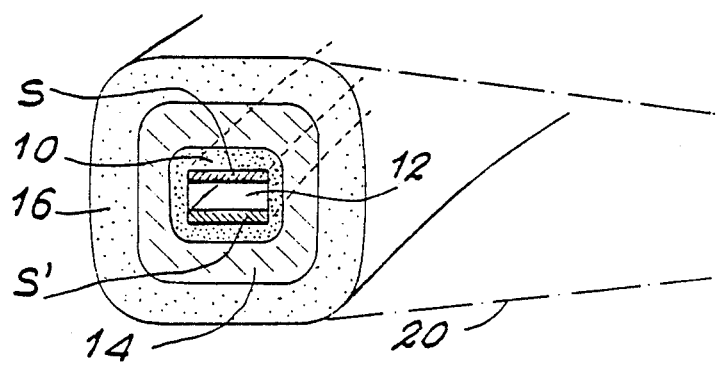
FIG. 2 in section an embodiment of the apparatus according to the invention.

The apparatus shown in FIG. 2 comprises two flat coils S and S' made from a superconductor material and surrounded by a strong toroidal structure 10, e.g. of carbon fibre or a composite material. Moreover, said structure must be thermally insulating. For this purpose it is possible to use so-called "super insulator" materials.

This toroidal structure defines a channel 12 in which flows a cooling fluid, e.g. liquid nitrogen, liquid neon or the like, or liquid helium if the operating conditions permit.

A toroidal magnetic circuit 14 surrounds structure 10. This circuit can be of permalloy or any other high magnetic permeability material and can also be superinsulating.

The assembly is arranged in a toroidal outer structure 16, e.g. of carbon fibre and superinsulator. The assembly is completed by a radial structure 20.

The calculation of the repulsive force is complex and entirely dependent on the determination of the magnetic induction distribution. By calculating the pressure as from the maximum value of the magnetic induction, we arrive at P = 100 MPa.

This pressure is exerted on the entire surface of the high magnetic permeability material coupling part 14, which will ensure the first mechanical maintaining structure of the two coils. The internal structure 12 will help to hold the coils. It will e.g. be constituted by a carbon fibre winding.

The carbon fibre has appropriate electrical and magnetic characteristics for this application:
breaking strength: 3000 MPa
Young's modulus: 300,000 MPa
density: 1.5

In an explanatory manner, it is possible to obtain an apparatus with the following parameters:
superconducting material coils:
  volume: $3.2 \; 10^{-4}$ m$^3$
  weight: 12 kg
magnetic coupling:
  volume: 0.01 m$^3$
  weight (permalloy d=8.9) :89 kg
Carbon fibre belt:
  volume: 0.023 m$^3$
  weight: 35 kg
Insulation:
  weight: 22 kg
Cryogenic system:
  liquid nitrogen type
  liquefier with compressor and Joule-Thomson pressure regulator
  fluid weight: 4 kg
  consumption of frigories: 5 W
  power of the group: 30 W
  total weight: 18 kg
conditioning electronics: 20 kg
i.e. in all 200 kg.

With regards to the energy charging and discharging of the apparatus according to the invention, it is possible to make use of the magnetic criticality property of superconductor materials. Thus, it is known that they are perfectly diamagnetic up to the induction value called the "critical induction", where the superconduction gradually disappears due to the striction effect resulting from the progressive penetration of the magnetic field into the material volume. This property makes it possible to construct true electrical valves.

Figure 3A:
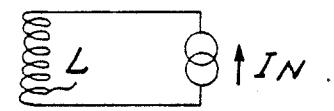
FIG. 3 two equivalent circuit diagrams of the apparatus according to the invention.
Figure 3B:
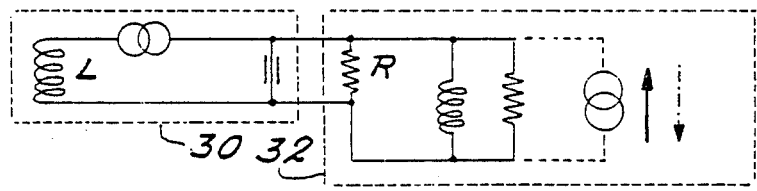

In terms of equivalent circuit diagrams, there is a transition between a pure self-induction coefficient coil, as shown in FIG. 3. diagram (a), where it is possible to see an inductance L and a fictional current generator IN, to a complex coil, as shown in diagram (b), where a limited portion 30 has high self-induction value with a reduced superconducting portion and another peripheral region 32 behaving in pure resistance. Thus, it is possible to inject by an external circuit a given electricity quantity, which on each occasion will correspond to an opening increment of the part of the coil controlled by the supplementary magnetic field. The extraction of electrically takes place by the reverse procedure.

Obviously, the actions of the striction field and the injection or ejection system must be strictly controlled.

Figure 4:
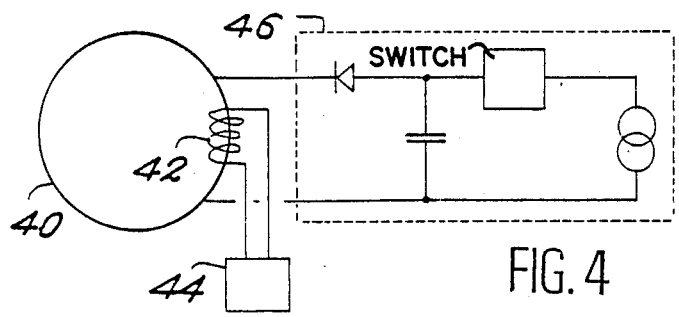
FIG. 4 diagrammatically the overall apparatus according to the invention.

FIG. 4 shows the complete apparatus with the double storage ring 40, a striction device having a winding 42 supplied by a power supply 44 and a current injection circuit 46.

I claim:

1. Electrical energy storage apparatus comprising at least one superconductor material coil (S), a means (42,44,46) for injecting a current into said coil and for extracting the current therefrom, characterized in that it also comprises a second superconductor material coil (S') coupled by mutual induction to the first coil (S) and in that it comprises a high permeability magnetic material (M) in the vicinity of the two coils.

2. Apparatus according to claim 1, characterized in that it comprises two identical coaxial coils (S,S') placed one above the other in two parallel planes.

3. Apparatus according to claim 1, characterized in that the two coils (S,S') are located within a torus (14) made from a high permeability magnetic material.

4. Apparatus according to claim 1, characterized in that the two coils (S,S') are placed within at least one strong material torus (10).

5. Apparatus according to claim 4, characterized in that the strong material is of carbon fibre.

6. Apparatus according to claim 4, characterized in that the strong material is a composite material.

7. Apparatus according to claim 4, characterized in that the strong material torus (10) defines a channel (12) in which flows a cooling fluid.

8. Apparatus according to claim 1, characterized in that the two coils (S,S') are placed in at least one torus (16) of a good thermal insulating material.

9. Apparatus according to claim 1, characterized in that the coil (S,S') are in the form of flat rings, each constituted by superconducting fibres.

10. Apparatus according to claim 1, characterized in that the injection and extraction means comprise a means (42,44) for applying a magnetic induction regulatable about a critical value to part of a coil.

11. Apparatus to claim 1, characterized in that the high magnetic permeability material (M) is permalloy.

* * * * *